Dec. 10, 1968   R. D. AUSTIN, JR   3,415,324
MICROMETER PITCH LINK
Filed May 15, 1967   4 Sheets-Sheet 1

INVENTOR.
ROBERT D. AUSTIN, JR.
BY George C. Sullivan
Agent

INVENTOR.
ROBERT D. AUSTIN, JR.
BY
George C. Sullivan
Agent

Dec. 10, 1968  R. D. AUSTIN, JR  3,415,324
MICROMETER PITCH LINK

Filed May 15, 1967  4 Sheets-Sheet 3

INVENTOR.
ROBERT D. AUSTIN, JR.
BY
Agent

Dec. 10, 1968        R. D. AUSTIN, JR        3,415,324
MICROMETER PITCH LINK
Filed May 15, 1967        4 Sheets-Sheet 4

INVENTOR.
ROBERT D. AUSTIN, JR.
BY
*George C. Sullivan*
Agent 3,415,324
MICROMETER PITCH LINK
Robert D. Austin, Jr., Woodland Hills, Calif., assignor to Lockheed Aircraft Corporation, Burbank, Calif.
Filed May 15, 1967, Ser. No. 638,552
17 Claims. (Cl. 170—160.22)

ABSTRACT OF THE DISCLOSURE

A micrometer pitch link connecting rod for providing a linkage between a helicopter blade and a gyro assembly, the pitch link being connected to the blade in such a manner as to position the blade on a hub at a predetermined pitch angle. The length of the pitch link is adjustable by two vernier adjustment means to provide a proper pitch link setting to position the blade at its preselected pitch angle.

BACKGROUND OF THE INVENTION

Field of the invention

This invention relates generally to rotary wing aircraft and more particularly to a means and method for positioning the rotor blades on the rotor hub at preselected pitch angles by the use of micrometer pitch links, thereby eliminating the necessity for determining the tracking characteristics of the main rotor blade by measuring the pitch of the blade tips after the blades have been installed on the aircraft. Within such rotary wing aircraft it is important that the several blades rotate within a predetermined cone of revolution and that each blade follows substantially a path on the surface of this cone. In the event that one or more blades glide above or below this surface, a cyclic vibration occurs which causes rotor shaft vibration. This vibration is transmitted to the control mechanism and then to the craft. Hence, it is desirable that any one blade follow as closely as possible the exact path of each of the others.

Description of the prior art

Heretofore, the method of assuring that each blade would rotate within the cone of revolution was that method commonly known as the blade tracking method. In such a method, when a new blade was added to the rotor, it was necessary that it be mounted onto the rotor hub; then the blades were rotated, with the tips of the blades extending into a tracking stand. During rotation, the tip path position of each blade was recorded with the new blade being adjusted to approximate the path of the other blades. This procedure of recordings and adjustments was continued until such time as the new blade was determined to be tracking properly.

The disadvantages of such a method were that the tracking operation was tedious and cumbersome, and that the whole aircraft had to be utilized in such an operation. Also, military specifications required that a rotor blade be replaced in the field without requiring dynamic tracking and adjustment after installation, which necessitated a new blade positioning method to meet this requirement.

SUMMARY OF THE INVENTION

This invention includes a micrometer pitch link which is adapted to be connected to a helicopter rotor blade for positioning the blade on a hub at a predetermined pitch angle. The pitch link includes an elongated member which is adjustable in length, the adjustment being a function of the total pitch angle deviation of the blade-hub arrangement from the pitch angle of the theoretically ideal blade-hub arrangement, whereby the pitch link can be preset prior to installation. The preset is based upon this deviation information for the purpose of positioning the blade in its proper blade tracking position.

An object of this invention is to provide a device which will permit main rotor blades to be installed on a rotary wing aircraft at such a position so as to eliminate the requirement for blade tracking.

Another object of this invention is to provide an adjustable calibrated connecting rod in the pitch control linkage to each helicopter blade.

A further object of this invention is to provide a blade pitch control link for use in the rotor system which may be adjusted to compensate for manufacturing tolerances so that rotor blades may be replaced without dynamic tracking after installation.

Another object of this invention is to provide a micrometer pitch link capable of being preset prior to installation based upon error deviation information, predetermined for any and all elements of the system which affect blade tracking.

Various other advantages will appear from the following description of one embodiment of the invention.

DETAILED DESCRIPTION

Figure 1:
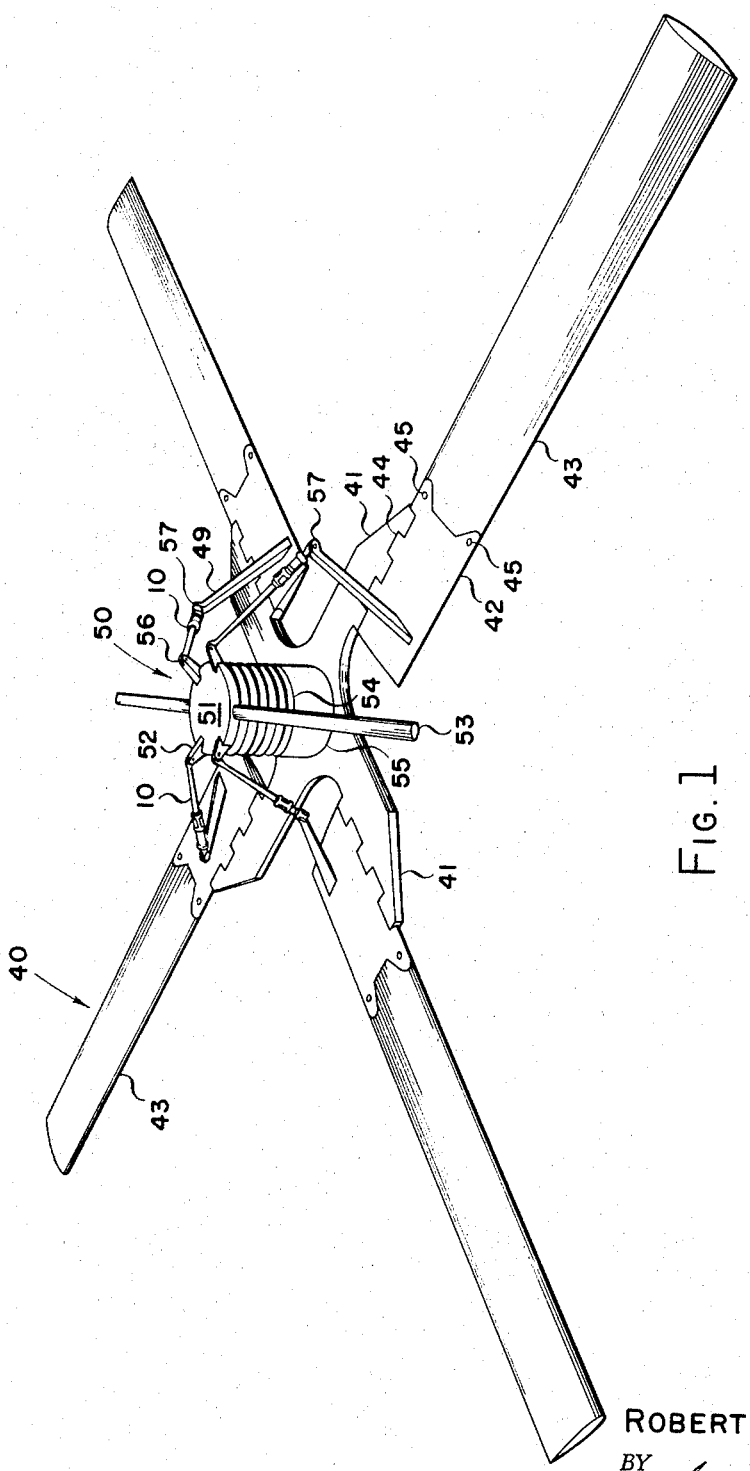
FIGURE 1 shows a plan view of the micrometer pitch link in combination with the gyro and rotor blades.

In the illustrated embodiment of the invention, FIGURE 1 shows a plurality of pitch link asemblies 10 in combination with the gyro asembly 50 and a plurality of rotor blade assemblies 40. The gyro assembly 50 includes a central portion 51 having a plurality of flanges 52 integrally connected thereto and a plurality of balances 53 radially extending from the upper surface of the central portion 51. Attached to the bottom of the central portion 51 is a corrugated diaphragm 54 to permit a tilting movement of the gyro assembly. The lower end of the diaphragm 54 is attached to a dome assembly 55. Located beneath the gyro assembly 30 are the rotor blade assemblies 40, each of which includes a fixed hub portion 41, a movable hub portion 42 and a rotor blade 43, the movable hub portion 42 being connected to the fixed hub portion 41 by means of hinges 44, and the blade 43 being connected to the movable hub 42, as by bolts 45. One end of each of the pitch link assemblies 10 is pivotally attached to a flange 52 of the gyro assembly 50 by means of a conventional pivot connection 56, while the other end is pivotally attached to a pitch link arm 49 by means of a conventional pivot connection 57.

Figure 2:
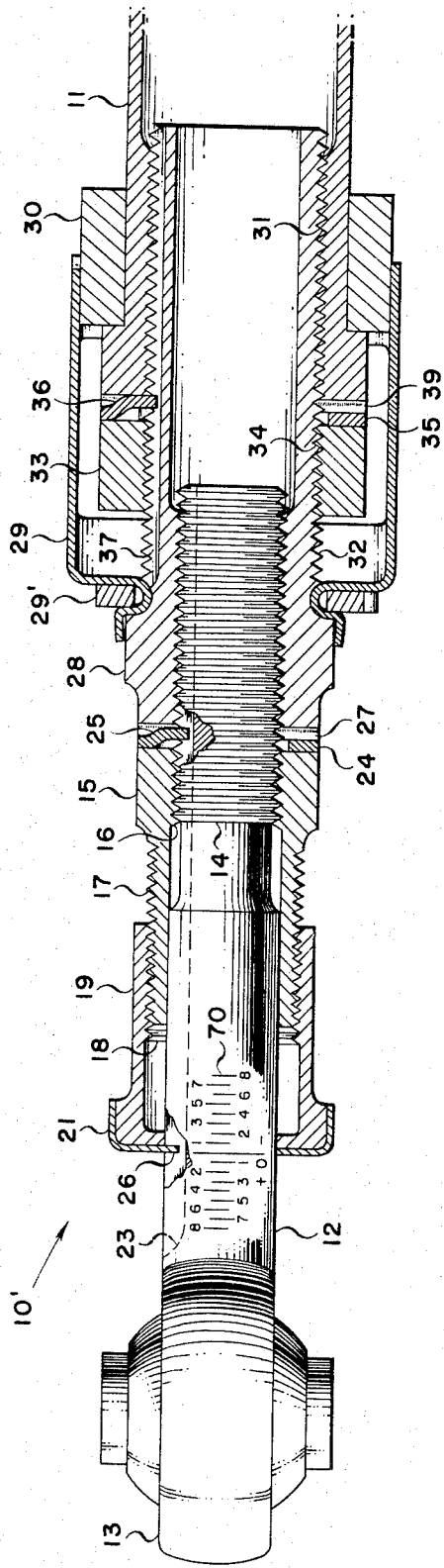
FIGURE 2 is a sectional plan view of the micrometer pitch link.
Figure 3:
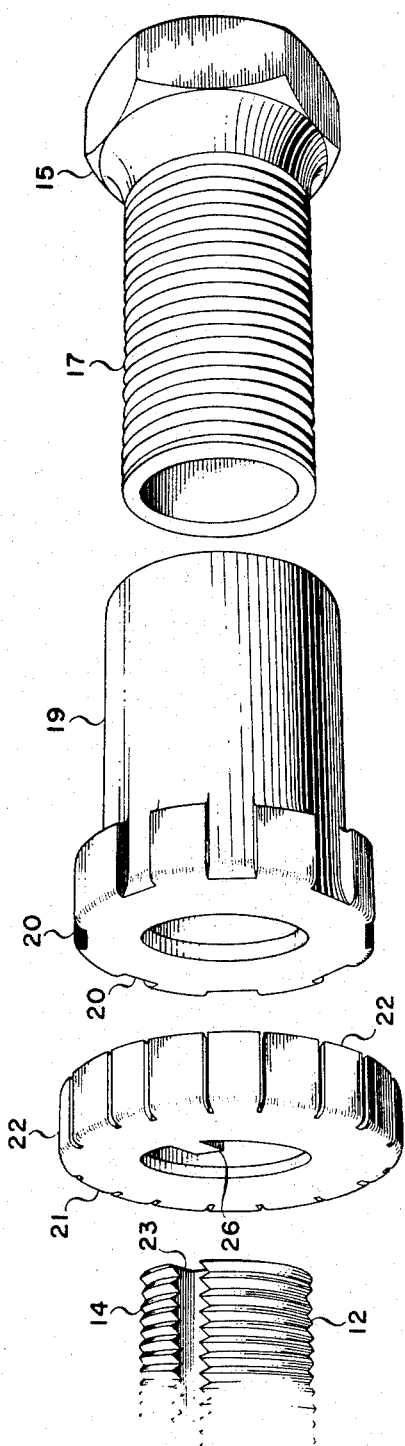
FIGURE 3 is a perspective view of the jam nut and carrier means.
Figure 4:
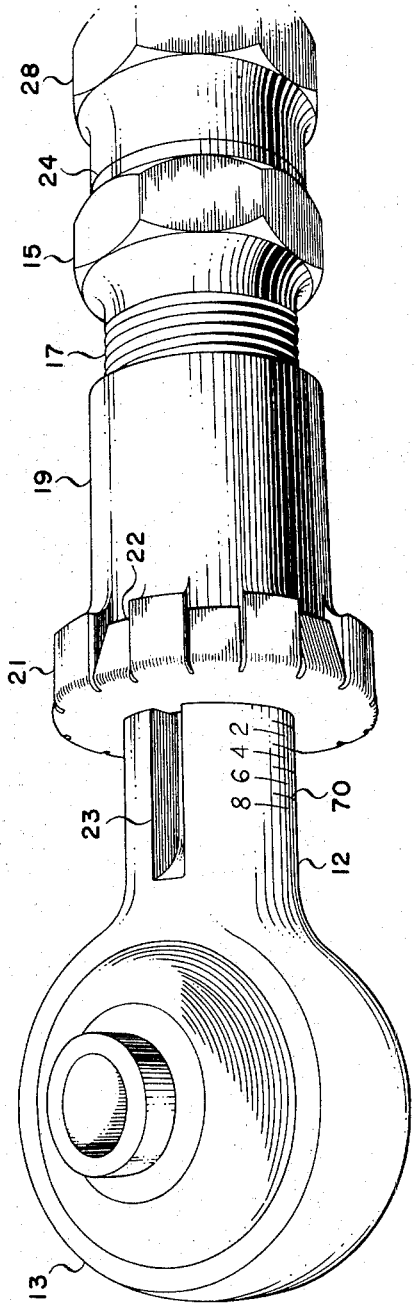
FIGURE 4 is a perspective view of the rod end assembly.

FIGURES 2-4 show the pitch link assembly 10 which includes a micrometer mechanism 10' attached to the link connecting rod 11. The micrometer mechanism 10' includes a rod 12 having a rod end 13, the rod 12 having external threads 14 located thereon. The rod 12 extends into a torque jam nut 15 and is threadedly engaged with internal threads 16 of the torque jam nut 15. The torque jam nut 15 also has external threads 17 with which to engage internal threads 18 of a carriage 19. At one end of the carriage 19 are a plurality of notches 20 (FIGURE 3). An indicator 21 extends over one end of the carriage 19 and has a plurality of tabs 22, the alternate ones of which are adapted to be bent into the notches 20. A projection 26 of the indicator 21 extends into a groove 23 contained longitudinally within the surface of the rod 12. Thus the carriage 19 is prevented from rotating relative to the rod 12 although permitted to move axially along rod 12.

Figure 5:
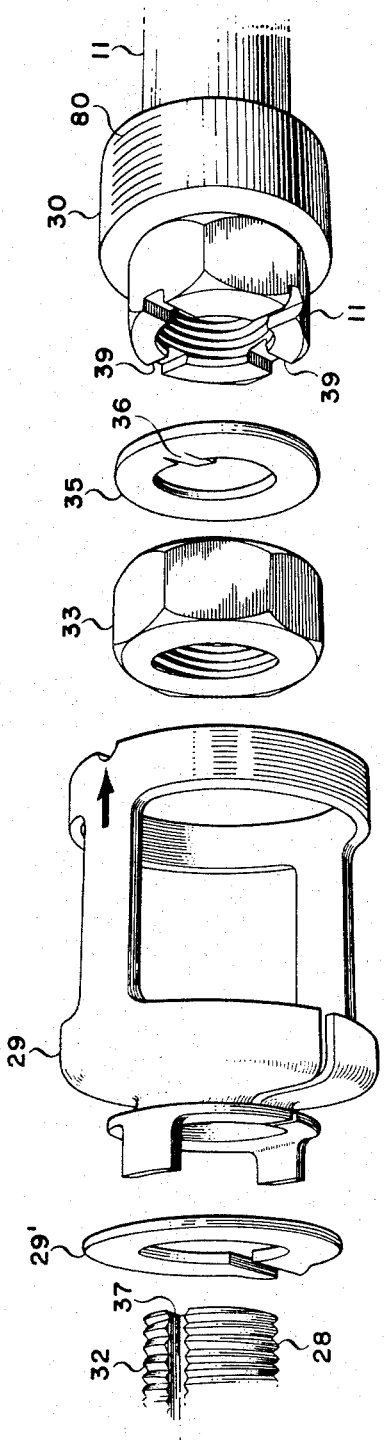
FIGURE 5 is a perspective view of the vernier and indicator means.
Figure 6:
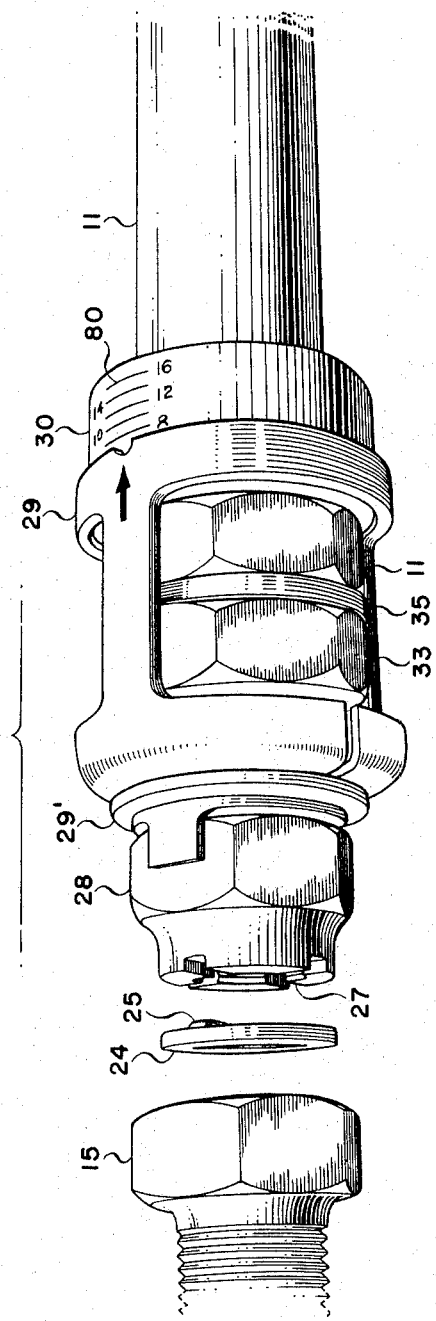
FIGURE 6 is a perspective view of the vernier assembly.

FIGURES 2, 5, and 6 show a lockwasher 24 having an internal tab 25 slidably engaged in the groove 23 of the rod 12. The jam nut 15 is used to force the lockwasher 24 against the face of a vernier adjuster 28. When this occurs the tab 25 of the lockwasher 24 also extends into a groove 27 of the vernier adjuster 28, there being four grooves 27 located at 90 degree intervals from each other in the illustrated configuration. This locks the vernier adjuster 28 against any relative rotation with respect to the rod 12. The vernier adjuster 28 is provided with internal threads 14' adapted for engagement with the threads 14 of rod 12. An indicator 29 includes an annular swaged portion 61 which extends into an annular groove 62 of the vernier adjuster 28. Retaining ring 29' extends into the swaged portion 61 to hold the indicator 29 into engagement with the vernier adjuster 28. A pair of ears 63 are also provided on the indicator 29 to extend over two of the wrench flats 64 of the vernier adjuster 28 to prevent any relative rotation therebetween. The other end 66 of the indicator 29 extends over a vernier 30 which is preferably integral with the connecting rod 11. A notch 67 is provided on that end of the indicator 29 and is used to indicate its position on a scale 80 of the vernier 30. The scale 80 in this illustrated embodiment of the invention is calibrated to measure one gradient for each 90 degree rotation of the vernier adjuster 28. The connecting rod 11 has internal threads 31 which extend over external threads 32 provided in the vernier adjuster 28. A torque jam nut 33 having internal threads 34 is also threadedly mounted over the vernier adjuster 28. Likewise, a lockwasher 35 is slidably engaged with the vernier adjuster 28 and includes an internal tab 36 which extends into a groove 37 which is contained longitudinally within the surface of the vernier adjuster 28. The jam nut 33 is used to force the lockwasher 35 against the face of the connecting rod 11. When this occurs, the tab 36 also extends into a groove of the connecting rod 11, there being four grooves 39 located 90 degrees from each other. This locks the vernier adjuster 28 against any relative rotation with respect to the rod 11. The grooves 27 and 39 are located in 90 degree increments and have been made to coinside with the 90 degree intervals of the indicator 29 on the vernier scale 80.

In adjusting the length of the pitch link, the first adjustment is by turning the rod end 13 so as to screw the rod 12 into the vernier adjuster 28. The rod end 13 is turned at half-turn intervals so that the axis of the pivot connection 56 is always at a predetermined angle with respect to axis of the pivot connection 57. Of course, this can be done only when the rod end 13 is free to rotate and not when it is attached to the assembly, as shown in FIGURE 1, and the lockwasher 24 is loosely assembled so that the tab 25 does not engage any of the grooves 27. It should be noted that the mutually engaged threads 17 of the jam nut 15 and the threads 18 of the carriage 19 are both left-handed threads, while the mutually engaged threads 14 of the rod 12, and 16 of the jam nut 15 are both right-handed threads. Therefore, when rotating the rod end 13 in half-turn increments with respect to the vernier adjuster 28, the carriage 19 is driven by the rod 12 through projection 26 and moves axially in the same direction as that of the rod 12. This results in a double lead action of the indicator 21, such that each half-turn of the rod end 13 equals one thread pitch change at the indicator 21 (in accordance with its calibration). Such information is depicted by scale 70 contained upon the surface of the rod 12. The inner annular surface of the indicator 21 is used to indicate the setting of the indicator 21 on the scale 70 of the rod 12.

The second means of adjusting the length of the pitch link is by turning the vernier adjuster 28 relative to the connecting rod 11 and the rod 12. This can be done when the rods 11 and 12 are in the mutually attached positions shown in FIGURE 1 and the lockwashers 24 and 33 are in their loosely assembled positions. The amount of the adjustment of the vernier adjuster 28 is measured in quarter-turn increments on the scale 80 contained upon the surface of the vernier 30. It should be noted here that the mutually engaged threads 32 of the vernier adjuster 28 and the threads 34 of the connecting rod 11 are right-handed threads, the same polarity as the mutually engaging threads 14 and 14' of the rod 12 and vernier adjuster 28, respectively. Upon rotation of the vernier adjuster 28 in either direction, the displacement of the connecting rod 11 with respect to the vernier adjuster 28 is opposite to the displacement of the rod 12 with respect to the vernier adjuster 28. This would usually produce a zero net displacement. However, the number of threads per inch of the internal threads 14' of the vernier adjuster 28 and the threads 14 of the rod 12 are less than the number of threads per inch of the exterior threads 32 of the vernier adjuster 28 and the threads 31 of the connecting rod 11. Because of this thread pitch differential, the displacement of the connecting rod 11 for each turn of the vernier adjuster 28 is greater than the displacement of the rod 12 in the opposite direction, thereby creating a net displacement in the length of the pitch link in the direction of the connecting rod 11. After adjustment by either method, the jam nuts 15 and 33 are tightened to lock the vernier adjuster 28 against any relative rotation with respect to the rods 11 and 12, thereby fixing the length of the pitch link.

It should also be noted in the second adjusting means that when the jam nut 15 moves in either direction towards its tightened position, the carriage 19 is caused to move in the opposite direction to that of the jam nut 15, resulting in a zero net change of the indicator 21 with respect to the rod 12 and thereby preventing any loss or distortion of any previous selected setting of the rod end indicator 21.

Prior to assembly of the blade unit, each individual element of the blade assembly, namely the blade, the movable hub, and the fixed hub is compared to its respective preselected, theoretically ideal standard and the deviation from normal of these elements with respect to its respective standard is recorded. For example, in comparing a blade to be balanced with a reference blade, the blade to be balanced is rotated together with the reference blade, using any known tracking method. The blade to be balanced is then adjusted until it tracks properly with the reference blade. The difference in the pitch angles of the blades is then measured by any conventional method with the difference noted on the balanced blade. Likewise, the movable hub and the fixed hub are also balanced in a similar manner. Therefore, according to this invention, an operator, knowing only the amount of deviation from normal of the blade pitch angle with respect to a preselected standard of each of the elements, an algebraically add all of these deviations determined by the above procedure, and then adjust the length of the pitch link in accordance with the sum of these deviations to compensate for them. After adjusting the length of the pitch link, all that is necessary is to attach the pitch link to the blade, thereby positioning the blade in the preselected angular position. This results in an accurate pitch adjustment, albeit very simple, because the adjustment means has been calibrated as a function of the total amount of deviation of the pitch angle of blade-hub arrangement from the pitch angle of a preselected standard blade-hub arrangement, namely, that the amount of turns of the vernier is a function of the blade angle correction.

In the illustrated embodiment of the invention, the thread pitch of threads 14 and 14' have been manufactured so that each halfturn of the rod 12 changes the length of the pitch link to equal seven minutes of the blade angle change correction. Also, because of the thread pitch differential between threads 14' and 32 of the vernier adjuster 28, each quarter-turn of the vernier adjuster 28 changes the length of the pitch link to equal one minute of the blade angle change correction. Here, with the vernier adjuster 28 locked with respect to the connecting rod 11, as shown on the scale 70, eight half-turns of the rod end 13 are available both in the plus and minus directions since subsequent vernier adjuster 28 adjustment in the same direction moves the rod end 13 in the opposite direction towards zero again. Likewise, 16 quarter-turns (plus or minus) of the vernier adjuster 28 are available in the same direction. A minus adjustment would lengthen the pitch link length and thus decrease the blade pitch angle while a plus adjustment would shorten the pitch link length and increase the blade pitch angle. For example, if the tolerances of the blade assembly were marked on each element as follows: the blade +6 minutes, the movable hub +4 minutes, the fixed hub −2 minutes and the sweep angle error +4 minutes, the total amount of deviation would be +12 minutes. Therefore, in this circumstance an operator proceeds by obtaining a micrometer pitch link which is preset at zero. He then makes 12 quarter-turns in the plus direction of the vernier adjuster 28 or, optionally, makes one half-turn in the plus direction of the rod 12 and five quarter-turns likewise in the plus direction of the vernier adjuster 28. Either method would shorten the pitch link length to equal the desired number of change in the increase of the blade pitch angle in minutes.

After making this adjustment, the pitch link is ready to be connected to the gyro and the blade to position the blade at its proper angular position.

As can be seen, the above method of correcting the blade pitch angle of any blade is done wholly and completely without the use of blade tracking on the aircraft. All that is necessary is the knowledge of the tolerance variation of the individual elements and adjustment of the micrometer pitch link accordingly.

It will be understood that various changes in the details, materials, steps and arrangements of parts which have been herein described and illustrated in order to explain the nature of the invention, may be made by those skilled in the art within the principle and scope of the invention as expressed in the appended claims.

I claim:

1. A micrometer pitch link for positioning a rotor blade, which is rotatably mounted about a pitch changing axis, on a rotor hub at a predetermined pitch angle comprising:
    an extensible elongated linkage, one end of which is adapted to be connected to the rotor blade;
    a first adjustment means located on a first portion of the linkage for changing the total length of the linkage;
    a first measuring means on the first portion for measuring the change in length of the linkage caused by the first adjustment means;
    a second adjustment means located on the second portion of the linkage for changing the total length of the linkage independent of the first adjustment means; and
    a second measuring means on the second portion for measuring the change in length of the linkage caused by the second adjustment means.

2. The invention in accordance with claim 1 further including means for holding the first measuring means constant during actuation of the second adjustment means.

3. The invention in accordance with claim 1 wherein the extensible elongated linkage includes:
    a hollow cylindrical connecting rod;
    a vernier adjuster, one end of which extends into one end of the cylindrical connecting rod; and
    a rod, one end of which extends into the other end of the vernier adjuster.

4. The invention in accordance with claim 3 wherein the first adjustment means includes means for varying the distance that the rod extends into the vernier adjuster.

5. The invention in accordance with claim 3 wherein the second adjustment means includes means for varying the distance that the vernier adjuster extends into the cylindrical connecting rod.

6. The invention in accordance with claim 5 wherein the second adjustment means further includes means for varying the distance that the rod extends into the vernier adjuster.

7. The invention in accordance with claim 4 wherein the first measuring means includes:
    a vernier scale located on the rod; and
    indicator means axially movable with the rod positioned adjacent the vernier scale for indicating on the vernier scale the relative displacement between the rod and the vernier adjuster.

8. The invention in accordance with claim 6 wherein the second measuring means includes:
    a vernier scale located on the cylindrical connecting rod; and
    indicator means positioned adjacent the vernier scale for indicating on the vernier scale the net displacement of the cylindrical connecting rod with respect to the rod.

9. The invention in accordance with claim 4 wherein the means for varying the distance that the rod extends into the vernier adjuster includes:
    thread means located on the one end of the rod; and
    thread means located on the other end of the vernier adjuster for mutually engaging the rod thread means.

10. The invention in accordance with claim 9 wherein the means for varying the distance that the vernier adjuster extends into the cylindrical connecting rod includes:
    thread means located on the one end of the vernier adjuster; and
    thread means located on the one end of the cylindrical connecting rod for mutually engaging the vernier adjuster thread means.

11. The invention in accordance with claim 9 which further includes:
    a first locking means for locking the rod in a fixed position with respect to the vernier adjuster; and
    a second locking means for locking the vernier adjuster in a fixed position with respect to the cylindrical connecting rod.

12. The invention in accordance with claim 10 wherein the mutually engaging threads of the rod and the vernier adjuster are of the same polarity as the mutually engaging threads of the vernier adjuster and the cylindrical connecting rod.

13. The invention in accordance with claim 12 wherein the mutually engaging threads of the vernier adjuster and the cylindrical connecting rod are of a greater thread pitch than the mutually engaging threads of the rod and the vernier adjuster.

14. The invention in accordance with claim 7 wherein the first measuring means further includes:
    carriage means located on the rod for supporting the indicator means, the carriage means having first thread means for mutually engaging thread means on the rod and second thread means for mutually engaging thread means on the indicator means, the mutually engaging threads of the indicator means and the carriage being of the same thread pitch but of the opposite polarity as the mutually engaging thread means of the rod and the carriage.

15. The method of positioning a rotor blade on a rotor hub using a pitch link comprising:
    measuring the deviation from normal of the rotor blade pitch angle with respect to a preselected standard blade pitch angle;

measuring the deviation from normal of the hub pitch angle with respect to a preselected standard hub pitch angle;

algebraically adding all of the deviations;

adjusting the length of the pitch link in accordance with the sum of the deviations to compensate for the deviations; and attaching the pitch link to the blade so as to position the blade in the preselected angular position.

16. The invention in accordance with claim 15 wherein the measuring of the hub pitch angle deviation includes:

measuring the deviation from normal of the movable hub pitch angle with respect to a preselected standard movable hub pitch angle; and measuring the deviation from normal of the fixed hub pitch angle with respect to a preselected standard fixed hub pitch angle.

17. The invention in accordance with claim 16 further including:

measuring the deviation from normal of the blade sweep angle with respect to a preselected standard sweep angle; and adding this deviation to the sum of the deviations of the rotor blade-hub combination prior to adjusting the length of the pitch link.

References Cited

UNITED STATES PATENTS

| | | | |
|---|---|---|---|
| 3,008,525 | 11/1961 | Jensen | 170—160.22 |
| 3,106,964 | 10/1963 | Culver et al. | 170—160.25 X |

EVERETTE A. POWELL, Jr., *Primary Examiner.*

U.S. Cl. X.R.

170—160.25